United States Patent [19]

Adachi et al.

[11] Patent Number: 4,804,854

[45] Date of Patent: Feb. 14, 1989

[54] LOW-NOISE ARRAYED SENSOR RADIATION IMAGE DETECTING SYSTEM WHEREIN EACH SENSOR CONNECTS TO A BUFFER CIRCUIT

[75] Inventors: Susumu Adachi; Masayuki Kamegawa, both of Kyoto, Japan

[73] Assignee: Shimadzu Corporation, Kyoto, Japan

[21] Appl. No.: 155,363

[22] Filed: Feb. 12, 1988

[30] Foreign Application Priority Data

Feb. 16, 1987 [JP] Japan ................................. 62-34288
Jul. 15, 1987 [JP] Japan ................................. 62-177869

[51] Int. Cl.$^4$ ............................................. H01J 40/14
[52] U.S. Cl. ................................. 250/578; 358/213.18
[58] Field of Search .......................... 250/578, 211 J; 357/30 H; 358/213.15, 213.18, 213.22

[56] References Cited

U.S. PATENT DOCUMENTS 4,413,283 11/1983 Aoki et al. ...................... 250/211 J
4,580,170 4/1986 Levine ........................... 358/213.18
4,689,808 8/1987 Moorman et al. ............. 358/213.18
4,733,097 3/1988 Iwabuchi et al. .................. 250/578

Primary Examiner—David C. Nelms
Assistant Examiner—William L. Oen
Attorney, Agent, or Firm—Koda and Androlia

[57] ABSTRACT

A radiation image detecting system whose radiation image receiving plane consists of a (m, n) sensor matrix is improved in the S/N ratio by providing radiation sensors constituting the sensor matrix with their respective buffer circuits. The buffer circuits prevent the capacitance components of the sensors from being transmitted to m row-side amplifiers and n column-side amplifiers causing both the m row-side amplifiers taking charge of the output from n radiation sensors and the n column-side amplifiers taking charge of the output from m radiation sensors to have their S/N ratio improved so as to depend on $\sqrt{n}$ and $\sqrt{m}$, respectively.

3 Claims, 4 Drawing Sheets

4,804,854

LOW-NOISE ARRAYED SENSOR RADIATION IMAGE DETECTING SYSTEM WHEREIN EACH SENSOR CONNECTS TO A BUFFER CIRCUIT

BACKGROUND OF THE INVENTION

The present invention relates to a radiation image detecting system with the radiation image receiving plane constituted of two-dimentionally arrayed radiation sensors as pixels, and more particularly to such a system improved in its signal-to-noise ratio.

A typical example of the arrayed-sensor type radiation image detecting system has its image recieving plane constituted, as is shown in FIG. 4, with a plurality of highly sensitive radiation sensors $D_{ij}$ (i=1, 2, ..., m; j=1, 2, ..., n) with a radiation receiving area smaller than ne square millimeter. Many such small sensors $D_{ij}$ are densely arranged so as to form a (m, n) sensor matrix having a necessary total area, for example, of about 30 cm square. Each of the sensors is made of a flat semiconductor piece plated on both surfaces with metallic layers as electrodes. The semiconductor piece is of a compound semiconductor such as CdTe, $HgI_2$ or the like. With a bias voltage kept supplied to the sensor through the electrodes, a radiation photon incident to the semiconductor part produces electric charges therein and makes the sensor output between the electrodes a charge pulse signal having an intensity proportional to the energy of the photon. According to FIG. 4, all of the upper-side electrodes of n radiation sensors aligned on each of m rows of the (m, n) sensor matrix are commonly connected and led to corresponding one of m row-side amplifiers $A_i$, while all of the lower-side electrodes of m radiation sensors aligned on each of n columns of the (m, n) sensor matrix are commonly connected and led to corresponding one of m column-side amplifiers $B_j$ through corresponding one of capacitors $C_j$. The capacitors $C_j$ are to protect the amplifiers $B_j$ from a bias voltage $V_b$ supplied to the radiation sensors from the lower side. With the amplifiers thus provided, a radiation photon incident to a particular radiation sensor $D_{ij}$ causes a row-side amplifier $A_i$ and a column-side amplifier to output their respective output pulse signals. In other words, a combination of outputs from two particular amplifiers $A_i$ and $B_j$ determines the radiation sensor irradiated by a radiation photon. However, when two or more photons coincidentally irradiate one sensor or different sensors $D_{ij}$, $D_{ij}'$, $D_{ij}''$... (or $D_{ij}$, $D_{i'j}$, $D_{i''j}$...) whose outputs are to be inputted to a common row-side amplifier $A_i$ (or $B_j$), namely, when both or either of the amplifiers $A_i$, $B_j$ outputs a signal larger than that corresponding to one photon, the coincidently irradiated different sensors can not be distinguished from each other or one another. In such a case, therefore, the outputs form the amplifiers $A_i$ and $B_j$ are to be ignored and not employed as pixel signals. Further, since the height of the output pulse signals from the amplifiers $A_i$ and $B_j$ is proportional to the energy of the photon which irradiates the sensor corresponding to the amplifiers, it also is possible, according to this type radiation image detecting system, to selectively obtain a specific radiation image due to a radiation having a particular wave length by discriminating the output signals of the amplifiers with respect to their pulse height.

In the above radiation image receiving system, each of the amplifiers has its input stage constituted with a charge amplification type pre-amplier making use of a field effect transistor. The output noise power of a charge amplification type amplifier is known to increase in proportion to the square value $C^2$ of the input-side capacitance C of the amplifier. In general the noise predominates in the output with $C \geqq 10$ pF.

Since the capacitance C may well be considered equal to the output-side capacitance of the signal source to the amplifier, and each of the amplifiers $A_i$, $B_j$ in the present case has its input connected with n or m radiation sensors in parallel, the input-side capacitances of $A_i$ and $B_j$ are respectively $nC_d$ and $mC_d$, where $C_d$ is the capacitance concerned with one radiation sensor $D_{ij}$ (and its wiring). Accordingly, the noise powers inputted to the row-side and the column-side amplifiers $A_i$ and $B_j$ are $(nC_d)^2$ and $(mC_d)^2$, respectively. This means that the noise of the system increases in proportion to the square of the number of radiation sensors constituting pixels, causing the signal-to-noise ratio (in voltage or current) to increase in proportion to the number of sensors concerned. In addition, the long wirings from the sensors to the amplifiers, which have high input impedance, also cause the amplifiers to be liable to pick up external noises.

OBJECTS AND SUMMARY OF THE INVENTION

The present invention aims at eliminating such disadvantages accompanying the conventional arrayed-sensor type radiation image detecting system, and makes it an object to provide a new arrayed-sensor type radiation image detecting system improved so that the deterioration in signal-to-noise ratio may be suppressed to be proportional to the square root of the number, not linerarly to the number, of radiation sensors constituting a radiation image receiving plane.

Another object of the present invention is to keep such an improved radiation image detecting system free from a possible sensitivity decrease due to the measures for improving the signal-to-noise ratio.

To achieve the above objects, according to the present invention, the radiation sensors are accompanied by their respective output buffer circuits through which the output signals from the sensors are inputted to corresponding row-side and column-side amplifiers. Each of the buffer circuits is preferably made up of a field effect transistor (FET) whose gate and drain are connected respectively to the output of the radiation sensor and to the input of the corresponding amplifier. Such buffer circuits provided to all of the radiation sensors have an effect to isolate the output-side capacitances of the radiation sensors from the input stage of the amplifiers, making the input-side parallel capacitance of the amplifiers free from the influence of the output-side capaciatances of the radiation sensors. Accordingly, the noise power at the output stage of each of the amplifiers decreases linearly depending on a single-sensor output-side capacitance $C_d$ squared ($C_d^2$) and multiplied by the number of the radiation sensors whose output signals commonly inputted to that amplifier. The above number of the radiation sensors is n for the amplifier being one of the m row-side amplifiers, and m for the amplifier being one of n column-side amplifiers, provided that the radiation sensors constitute a (m, n) sensor matrix. However, the output signal from the sensor must be branched both to a row-side amplifier and to a column-side amplifier, resulting in a decrease in the output of the buffer circuit to ½. Such an sensitivity decrease is overcome, according to the present invention, by incorporating to the buffer circuit a current mirror-circuit having two output terminals: one is for the row-side amplifier and the other for the column-side amplifier.

In any event the present invention improves the noise powers of the accompanying row-side and column-side amplifiers respectively to $nC_d^2$ and $mC_d^2$, which are reduced respectively to 1/n and 1/m of the noise powers $(nC_d)^2$ and $(mC_d)^2$ expected in case of the conventional system as shown in FIG. 4.

BRIEF DESCRIPTION OF THE DRAWINGS

In the following the present invention is described in further detail on reference to the accompanying drawings in which.

DETAILED DESCRIPTION OF THE INVENTION

Figure 1A:
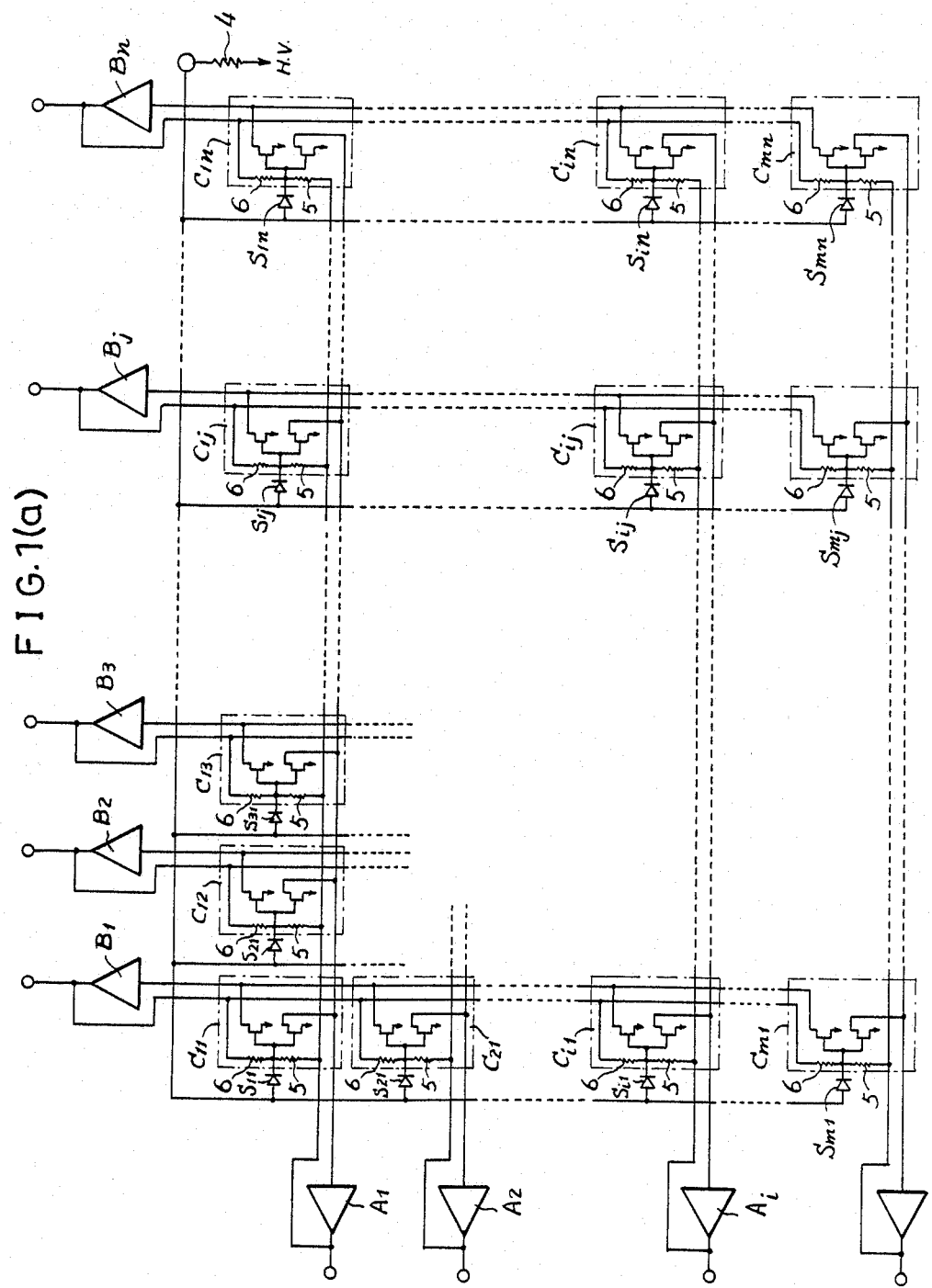
FIG. 1(a) shows a semi-blockdiagrammatical entire circuit constitution in an embodiment of the present invention.
Figure 1B:
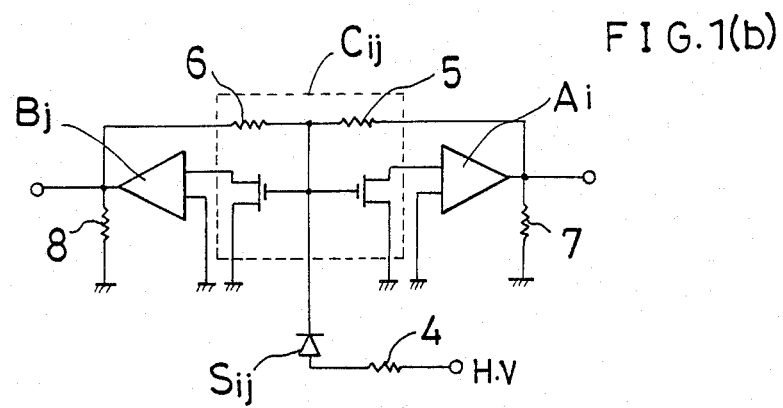
FIG. 1(b), which is a partial detail of FIG. 1(a), shows the buffer circuit accompanying each of the radiation sensors in the above embodiment together with the connecting relation to a row-side and a column-side amplifiers.
Figure 2:
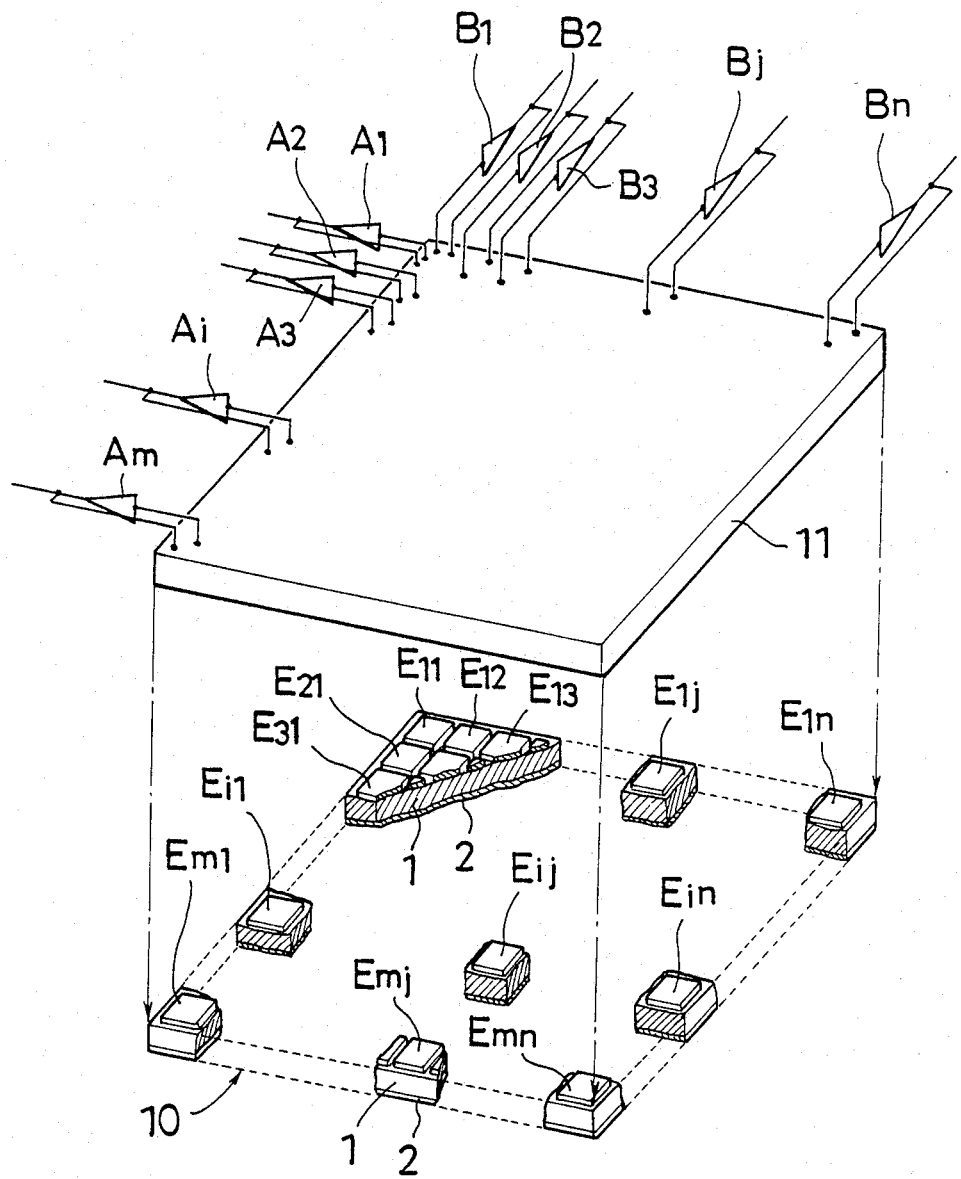
FIG. 2 shows a perspective dismantled view of the above embodiment.
Figure 4:
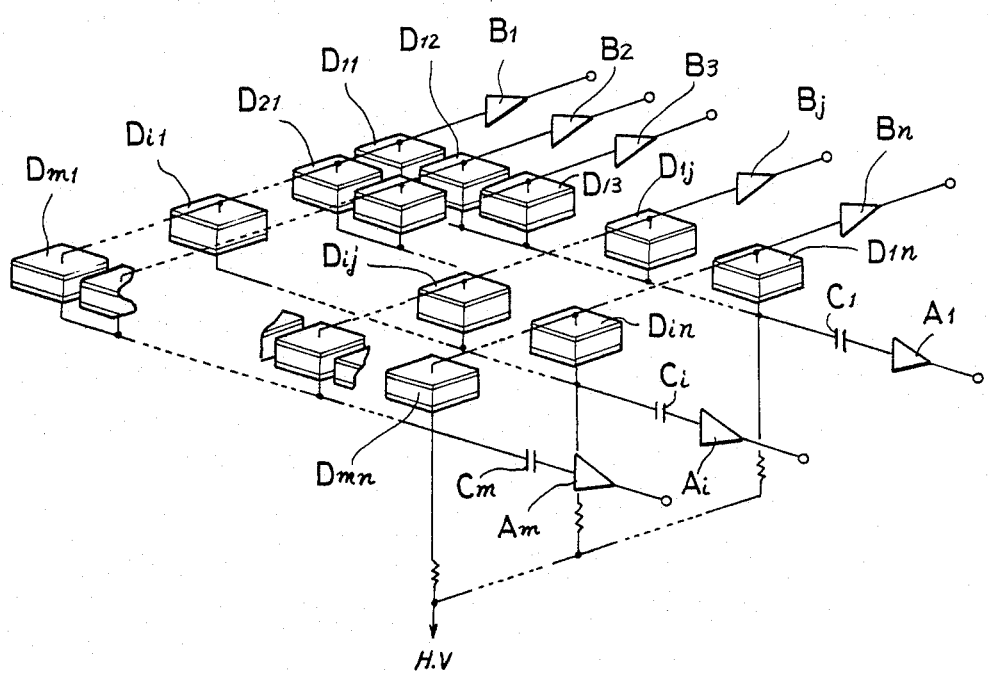
FIG. 4 shows a perspective view of a conventional arrayed-sensor type radiation image detecting system.

Referring to FIG. 2, which schematically shows a perspective dismantled view of an embodiment of the present invention, a (m, n) radiation sensor matrix 10 is constituted with a semiconductor plate 1 plated on the lower face with a common electrode 2 and on the upper face with a plurality of sensor electrodes $E_{ij}$ (i=1, 2, . . . , m; j=1, 2, . . . , n) arranged so as to form a (m, n) electrode matrix. Each of the sensor electrodes $E_{ij}$, the semiconductor plate 1 and the common electrode 2 form each of all the individual radiation sensors contained in the (m, n) radiation sensor matrix 10. The radiation sensors, which can not be shown positively in FIG. 2, are given a reference sign $S_{ij}$ and represented with diode symbols in the folowing drawings FIGS. 1(a), 1(b), 3(a) and 3(b) illustrating the circuit constitutions of this and other embodiments, firstly because there is no suitable symbol for a radiation sensor, and secondly because there may occasionally be formed a diode between the semiconductor plate 1 and each of the sensor electrodes $E_{ij}$ according to the metallic substance used for the sensor electrodes. It should be noticed, however, that the formation of diodes between the semiconductor and the electrodes is not an essential matter to the function of radiation sensing. It is to be emphasized that the use of diode symbols for the radiation sensors $S_{ij}$ is only for convenience. With the description returned to the constitution of the embodiment, the electrodes $E_{ij}$ defining the individual diation sensors $S_{ij}$ on the semiconductor plate 1 has a dimension smaller than 1 mm$^2$ to comply with a high resolving power required to the radiation image to be detected, while the semiconductor plate 1 usually has a large area reaching 1000 cm$^2$ in accordance with the dimension of an object whose image is to be detected. The semiconductor plate having such a large area can easily effected also by joining together a plurality of semiconductor plates with a smaller area. This sensor matrix is accompanied by a circuit board 11 carrying thereon m×n buffer circuits $C_{ij}$ (not shown in FIG. 2; described later with FIGS. 1(a) and (b)), each of which interposes between each of the radiation sensors $S_{ij}$ (hidden under the electrodes $E_{ij}$) and each of m row-die amplifiers $A_i$ and of n column-side amplifiers $B_j$.

With the outward appearance as described above, this embodiment has its electronics composed of the above mentioned buffer circuits $C_{ij}$ and amplifiers $A_i$, $B_j$. As is shown in FIG. 1(a) illustrating the entire circuit constitution of the embodiment, the buffer circuits $C_{ij}$ are provided in correspondence one-to-one with the radiation sensors $S_{ij}$ represented by diode symbols, and their outputs grouped with respect to the rows and columns of the sensor matrix and then inputted to their respective corresponding row-side and column-side amplifiers $A_i$ and $B_j$. The details of the buffer circuits are illustrated in FIG. 1(b) with a representative circuit $C_{ij}$ exemplified. In FIGS. 1(a) and 1(b), each of the sensors $S_{ij}$ (as considered diodes) is inversely biased through a resistor 4, two branching resistors 5 and 6, and load resistors 7 and 8 of the corresponding row-side and column-side amplifiers $A_i$ and $B_j$, so that the potential at the cathode of the sensor $S_{ij}$ (as a diode) may be kept substantially at zero volt. With the sensor $S_{ij}$ so biased, a current which flows in the sensor $S_{ij}$ in the inverse direction when irradited with radiation passes through the above resistors 5 and 6 (feedback resistors), causing the amplifier $A_i$ and $B_j$ output their respective pulse signals corresponding to a pixel signal from the sensor $S_{ij}$.

In the above process of radiation signal detection, all the row-side and column-side amplifiers $A_i$ and $B_j$ are isolated from the sensor $S_{ij}$ by their respective buffer circuits $C_{ij}$. Accordingly, each of the row-side and column-side amplifiers $A_i$ and $B_j$ has its output noise power made dependent on $C_d^2$ multiplied by m or n ($C_d$: the capacitance of one diode), not dependent on $(mC_d)^2$ or $(nC_d)^2$. Thus the signal-to-noise ratio of the radiation image detecting system is largely increased by the present invention.

Figure 3A:
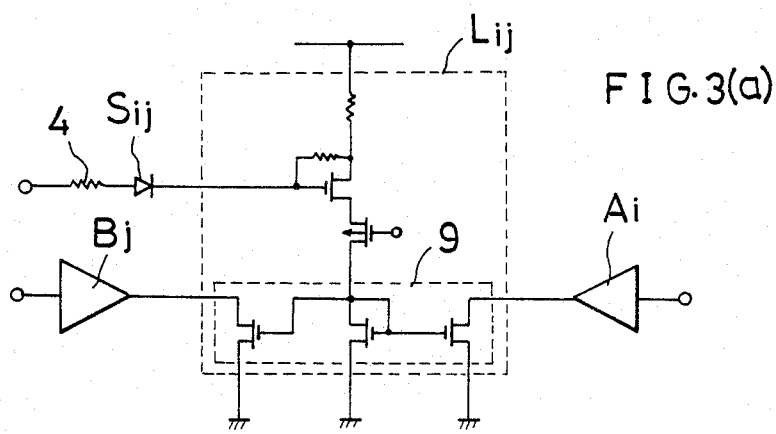
FIG. 3(a) shows a modified buffer circuit to be used in the above embodiment.

In the above embodiment, however, since the signal current through the sensor $S_{ij}$ is branched into the two resistors 5 and 6, the output signals from the row-side and column-side amplifiers $A_i$ and $B_j$ reduce by half. To avoid such sensivity decrease, the present invention can be embodied by modifying each of the above buffer circuit $C_{ij}$ to a circuit $L_{ij}$ as shown in FIG. 3(a). This buffer circuit includes a current mirror-circuit 9 having two output terminals respectively for the row-side amplifier $A_i$ and the column-side amplifier $B_j$. This current mirror circuit is, in fact, a current amplifier preventing the sensor output from being decreased to ½ owing to branching into two row-side and column-side amplifiers $A_i$, $B_j$.

Figure 3B:
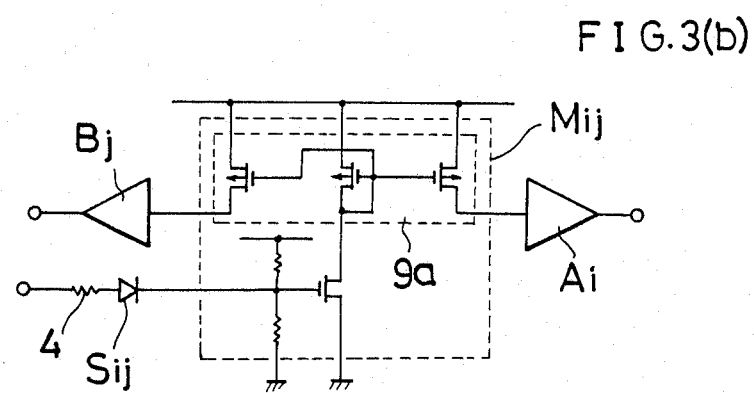
FIG. 3(b) shows a further modified buffer circuit to be used in the above embodiment.

Such a buffer circuit having a current mirror-circuit can be further modified as shown in FIG. 3(b), in which the modified buffer circuit and the current mirror-circuit contained therein are reference-signed with $M_{ij}$ and 9a respectively.

We claim:

1. A radiation image detecting system whose radiation image receiving plane consists of a plurality of radiation sensors arrayed so as to form a two-dimensional (m, n) sensor matrix, said radiation image detecting system comprising:
- buffer circuits through which radiation signals detected by said radiation sensors are outputted, said buffer circuits being provided in one-to-one correspondence with said radiation sensors;
- m row-side amplifiers, each of which amplifies radiation signals detected by the radiation sensors belonging to each of n rows of said (m, n) sensor matrix; and
- n column-side amplifiers, each of which amplifies radiation signals detected by the radiation sensors arrayed in each of n columns of said (m, n) sensor matrix.

2. A radiation image detecting system defined in claim 1, wherein each of said buffer circuits comprises two field effect transistors with their gates commonly connected to accept radiation signals detected by one of said radiation sensors and with their respective drains inputted to one of said row-side amplifiers and to one of said column-side amplifiers, respectively.

3. A radiation image detecting system defined in claim 1, wherein each of said buffer amplifiers consists of a field effect transistor with it gate connected to one of said radiation detectors to accept radiation signals detected by the same and with its channel circuit accompanied by a current mirror-circuit having two output terminals for transmitting said radiation signals to one of said row-side amplifiers and to one of said column side amplifiers, respectively.

* * * * *